United States Patent [19]

Novak et al.

[11] Patent Number: 4,513,243
[45] Date of Patent: Apr. 23, 1985

[54] CORE FORM TRANSFORMER FOR SELECTIVE CANCELLATION OF SUBSYNCHRONOUS RESONANCE

[75] Inventors: Paul G. Novak, Hubbard, Ohio; Theodore R. Specht, Sharon, Pa.

[73] Assignee: Westinghouse Electric Corp., Pittsburgh, Pa.

[21] Appl. No.: 502,379

[22] Filed: Jun. 8, 1983

[51] Int. Cl.³ .............................................. H01F 33/00
[52] U.S. Cl. ........................................ 323/361; 336/5; 336/12; 336/183
[58] Field of Search ........................ 323/355, 356, 361; 336/5, 10, 12, 155, 182–183, 214–215

[56] References Cited

U.S. PATENT DOCUMENTS

| 2,602,152 | 7/1952 | Storsand | 336/12 X |
| 2,866,152 | 12/1958 | Prior | 323/361 |
| 3,671,901 | 6/1972 | Lys | 336/5 |
| 3,691,496 | 9/1972 | Beavo | 336/150 |
| 3,876,929 | 4/1975 | Laing | 323/361 |
| 4,433,284 | 2/1984 | Perkins | 323/361 |

FOREIGN PATENT DOCUMENTS 0725290 3/1955 United Kingdom ................ 323/361

Primary Examiner—Peter S. Wong
Attorney, Agent, or Firm—John Victor Pezdek

[57] ABSTRACT

A three phase core form transformer for use in a three phase dual dynamic stabilizer system that provides reactive power compensation. The transformer has a three legged magnetic core, a plurality of primary windings corresponding to the phases, two auxiliary secondary windings per phase that are wound to provide first and second common bifilar portions, and a plurality of principal secondary windings corresponding to the number of primary windings. The first common bifilar portion, the principal secondary winding, the second common bifilar portion and the primary winding are placed coaxially and radially adjacent, in the recited order, starting from each leg of the magnetic core.

The primary windings are connected in delta. The principal secondary windings and auxiliary secondary windings are connected in a forked wye wherein one auxiliary secondary winding of each of the other two phases is electrically connected to the free end of each of the wye connected principal secondary windings. This results in all three phases being present in each combination of principal secondary windings and auxiliary secondary windings. With this arrangement of windings the leakage reactance of the principal secondary winding and the common leakage reactance of the auxiliary secondary windings attached thereto for each phase are positive in value with the leakage reactance of the principal secondary winding being made to be about twice that of the common leakage reactance of the auxiliary windings.

The primary windings can be continuous wound windings with the principal secondary windings and the auxiliary secondary windings being helitran wound windings.

5 Claims, 8 Drawing Figures

CORE FORM TRANSFORMER FOR SELECTIVE CANCELLATION OF SUBSYNCHRONOUS RESONANCE

CROSS REFERENCE TO RELATED APPLICATION

This application is related to copending application Ser. No. 502,374, filed June 8, 1983, entitled "Method and Apparatus for Selective Cancellation of Subsynchronous Resonance".

BACKGROUND OF THE INVENTION

1. Field of the Invention

The present invention relates to the area of reactive power (VAR) compensation and in particular a core form coupling transformer which is used with dynamic stabilizers to provide stabilization to AC electrical generators or turbine generators against subsynchronous resonance.

2. Description of the Prior Art

Maximizing the operational reliability and efficiency of large electrical systems frequently requires the use of reactive power (VAR) compensation. For example, industrial users commonly employ shunt capacitors, switched by conventional means, to provide the reactive power required by their load. Because use of the capacitors results in improved load power factor and load bus voltage support, significant rate savings and improvements in production process efficiency are generally realized. In a like manner, transmission engineers have applied series capacitors and switched shunt reactors and capacitors to high voltage transmission lines for purposes of increasing transmission capacity and transient stability margins, providing voltage support, and limiting steady-state and transient overvoltages.

A major problem in the application of series connected capacitor compensated transmission lines is the occurrence of subsynchronous resonance. In subsynchronous resonance, the transmission line and series capacitor exhibit series resonance at a frequency below the system frequency which is typically 60 Hz. Disturbances or faults can easily excite low frequency resonant currents. These low frequency resonant currents can affect the turbine generator sets supplying the electrical transmission line. A mechanical resonance between the generator rotor, turbine rotor and the shaft connecting the generator and turbine can be excited by these low frequency resonant currents and will continue to grow indefinitely once started. If permitted to continue, subsynchronous resonance is destructive to the machinery.

One method for controlling subsynchronous resonance is to apply a reactive load periodically to the terminals of the generator. Reactors are switched on and off by means of reverse parallel thyristor pairs. While this circuit arrangement provides compensation to the transmission line and generator, it can also cause undesirable odd harmonic currents to flow to the generator that are proportional to the size of the reactor being controlled. At times, the conduction angle of the thyristor switches is reduced to decrease the reactive current flow to the generator, a condition which accentuates the odd harmonic currents found in the stabilizer.

By arranging the thyristor controlled reactors in a delta configuration the triple odd harmonic currents, e.g. 3rd, 9th, 15th, can be substantially cancelled under balanced three phase operation. However, the other harmonic currents do not cancel. Thus, another means for providing cancellation of the odd harmonic currents other than the triple odd harmonic currents would be desirable.

In most electrical systems which utilize dynamic stabilizers, the stabilizer is ordinarily connected to the generator through a multiphase coupling transformer in order to provide a suitable operating voltage level for the thyristors and associated reactors. This transformer, usually three phase, can be of either a shell form or core form construction. Where a core form construction is used, the primary, principal secondary, auxiliary secondary windings are wound about each leg of the transformer core as shown in FIG. 1. The two auxiliary secondary windings, also known as stub windings, the principal secondary winding and the primary winding for each phase are positioned coaxially and radially adjacent, in the recited order, starting from the leg of the core.

Theoretically, the transformer that is used to interconnect the stabilizers with the generator should cause the selective cancellation of certain odd harmonic frequencies generated by the phase angle firing of the thyristors in the stabilizers. Unfortunately, the leakage reactances of the transformer tend to prevent this cancellation particularly when the reactance is a sizable percentage of the effective reactance of the dynamic stabilizers. Because of the duty cycle of the stabilizer (i.e. the short periods of time during which the stabilizer is fully on), the volt ampere rating of the transformer can be considerably less than the full-on volt ampere rating of the stabilizer. For instance, the volt amperes required may be as low as 20% of the full-on volt amperes. As a result, a situation occurs where the transformer leakage reactance adds significantly to the reactance of the stabilizer when the thyristors are conducting. Thus, it would be desirable to have a transformer that is constructed so that the effects of the leakage reactance thereof can be beneficially applied to the selective cancellation of the harmonic frequencies of currents that occur in the dynamic stabilizers.

Present designs for core form transformers cannot economically provide the proper value of leakage reactances for the windings required for the selective cancellation of subsynchronous resonance described hereinafter. As disclosed in the referenced copending related application, the leakage reactance of the secondary windings must be about twice the value of the common leakage reactance of the auxiliary secondary windings with both values being positive. Further, the ratio of the number of turns in the auxiliary secondary windings to the number of turns in the principal secondary windings should be $(\sqrt{3}-1)/2 \pm 0.1\%$. The turns ratio between the primary and principal secondary windings is not specified as it is used primarily to control the voltage transformation necessary to achieve the operating voltage level required by the stabilizers. Although the turns ratios which are specified can be achieved by those skilled in the art with the arrangement shown in FIG. 1, the value of the leakage reactance of each of the principal secondary winding with this arrangement is negative. Analysis can show that for the winding arrangement shown in FIG. 1 this leakage reactance value can be made positive. However, with this arrangement the spacing required between the windings to achieve the proper values of leakage reactance for each phase would be so great that it would exceed the capacity of present commercially available transformer fabrication equipment. Thus, it would be advantageous to have a winding arrangement for a core form, forked wye transformer that would allow fabrication on existing fabrication equipment and achieve the required leakage reactance values necessary for selective harmonic cancellation.

SUMMARY OF THE INVENTION

The present invention is a three phase core form transformer for use in a three phase dual dynamic stabilizer system that provides reactive power compensation. The transformer has a three legged magnetic core, a plurality of primary windings corresponding to the phases, two auxiliary secondary windings per phase that are wound to provide first and second common bifilar portions, and a plurality of principal secondary windings corresponding to the number of primary windings. The first common bifilar portion, the principal secondary winding, the second common bifilar portion and the primary winding are placed coaxially and radially adjacent, in the recited order, starting from each leg of the magnetic core.

The primary windings are connected in delta. The principal secondary windings and auxiliary secondary windings are connected in a forked wye wherein one auxiliary secondary winding of each of the other two phases is electrically connected to the free end of each of the wye connected principal secondary windings. This results in all three phases being present in each combination of principal secondary windings and auxiliary secondary windings. With this arrangement of windings the leakage reactance of the principal secondary winding and the common leakage reactance of the auxiliary secondary windings attached thereto for each phase are positive in value with the leakage reactance of the principal secondary winding being made to be about twice that of the common leakage reactance of the auxiliary windings.

As disclosed in the copending application, the transformer of the present invention is made so that the turns ratio between the principal secondary winding and the auxiliary secondary windings is made equal to $(\sqrt{3}-1)/2 \pm 0.01\%$. This rotates the phases of resonant currents in the dynamic stabilizers by approximately 30 degrees with respect to each other and approximately 15 degrees with respect to the phase of the attached principal secondary winding. The combination of phase rotation and positive leakage reactance result in the selective cancellation of resonant currents produced in the dynamic stabilizers connected to the auxiliary secondary windings.

The primary windings can be continuous wound windings with the principal secondary windings and the auxiliary secondary windings being helitran wound windings.

BRIEF DESCRIPTION OF THE DRAWINGS

For a better understanding of the invention reference may be made to the preferred embodiments exemplary of the invention shown in the accompanying drawings.

DESCRIPTION OF THE PREFERRED EMBODIMENTS

Figure 2:
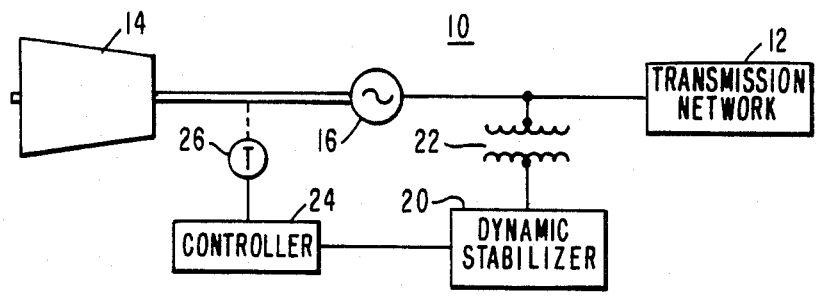
FIG. 2 is a simplified schematic representation of an electrical system utilizing the present invention.

Shown in FIG. 2 is an electromechanical network 10 consisting of a transmission network 12, turbine 14 and generator 16. The electrical network 10 is a multiphase alternating current (AC) system preferably having three phases. A dynamic stabilizer 20 is interconnected to the network 10 via a coupling transformer 22. Because the system voltage of the electrical network is typically much greater than that desired for operation of the dynamic stabilizer 20, the coupling transformer 22 acts to step down the system operating voltage to a suitable operating voltage level for the components associated with the stabilizer 20. The transformer 22 also performs other functions described hereinafter.

A controller 24 is provided to control the compensation provided by the dynamic stabilizer 20. The controller 24 senses the speed of the rotor of the generator 16 via a speed sensor such as a tachometer 26 to determine the stabilization required by the generator 16 and in accordance with these requirements generates a control signal which adjusts the conduction angle firing of thyristors in the stabilizer 20 to establish the necessary reactive currents to be supplied as compensation to the generator 16.

While the dynamic stabilizers 20 and transformer 22 are shown connected to the illustrated electrical network 10, it should be realized that the particular form of the electrical network is not critical to the operation of the present invention. The dynamic stabilizer and associated coupling transformer can provide selective cancellation of harmonic currents when interconnected to other forms of electrical networks. Because the majority of applications for the present invention would be with three phase electrical networks, the embodiment of the invention discussed hereinafter will be a three phase configuration. The three electrical phases are identified by the letters a, b and c and have substantially balanced AC voltages and AC currents which are displaced by about 120 electrical degrees ($\frac{2}{3}\pi$ radians) with respect to each other. The windings of the coupling transformer which are associated with a particular electrical phase are marked with the identifier for that phase. In addition, the use of the terms "phase" and "degree(s)" means "electrical phase" and "electrical degree(s)", respectively.

The operating voltage, KVA rating and the basic insulation level of the transformer establish the physical parameters of the core and windings. The rating of the transformer determines the current flow in the windings that in turn sets the conductor size and establishes the winding size. Further, the voltage and KVA of the transformer determine the optimum volts per turn of winding that sets the number of turns and the size of the core. The core is chosen to have sufficient area to limit induction to an acceptable value, usually 18,000 gauss or less, in order to prevent core saturation and achieve proper transformation. In general the higher the KVA, the higher the volts per turns and the greater the core size.

These parameters as well as the operating frequency affect the particular value of leakage reactance for a given winding. However once the operating parameters for a particular transformer of the present invention are specified, the values of leakage reactance required for the transformer are readily achieveable through known design techniques. Accordingly, in the following description of the transformer, dimensions of the windings, conductor size, spacing between windings and other dimensional data is not given. Transformers utilizing the winding arrangement disclosed herein will, in general, have a KVA rating in excess of 1,000 KVA (1 MVA) and voltage ratings in excess of 10,000 volts AC.

DUAL DYNAMIC STABILIZER CONFIGURATION

Figure 3:
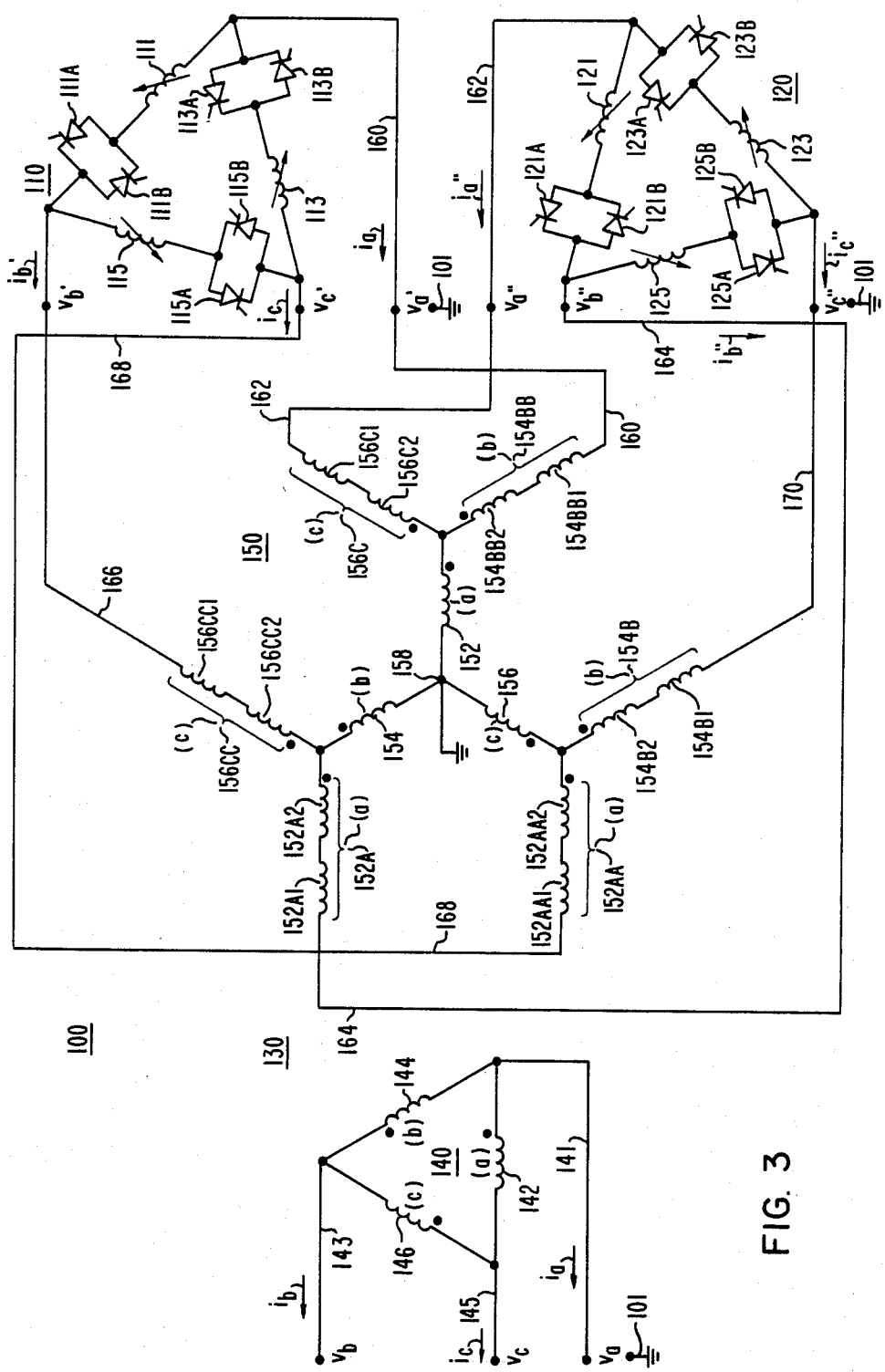
FIG. 3 is a schematic representation of an embodiment of the present invention utilizing dual dynamic stabilizer and a coupling transformer.

Referring to FIG. 3, the general configuration for a dual dynamic stabilizer system 100 is illustrated. The system 100 comprises two dynamic stabilizers 110 and 120 and a coupling transformer 130. The transformer 130 has a primary side 140 and a secondary side 150, each side having a plurality of multiturn windings. The primary windings 142, 144 and 146 are electrically connected in a delta configuration and have the terminal voltages $v_a$, $v_b$ and $v_c$ with respect to ground 101. The primary side 140 is electrically connected to a generator (not shown) by the conductors 141, 143 and 145 which are electrically connected to the corners of the delta-connected primary windings. The currents $i_a$, $i_b$ and $i_c$ are supplied from the system 100 for stabilization of the electrical system.

The secondary side 150 of the transformer 130 consists of two groups of multiturn windings—principal secondary windings 152, 154 and 156 and the corresponding auxiliary secondary windings 152A, 152AA, 154B, 154BB, 156C and 156CC. The two auxiliary windings for each principal secondary windings, for example windings 152A and 152AA for winding 152 are also known as stub, tertiary, or zig-zag windings and in the transformer are wound about the same magnetic leg or core as their associated principal secondary winding. Each auxiliary winding pair 152A and 152AA, 154B and 154BB, 156C and 156CC is wound adjacent one another in order to maximize magnetic coupling therebetween. These pairs are also known as bifilar windings. For reasons explained hereinafter, each auxiliary secondary winding pair is wound to provide first and second common bifilar portions which are electrically connected in series. Thus, winding 152A is formed from winding portion 152A1 and winding portion 152A2 and winding 152AA is made up of winding portions 152AA1 and winding portion 152AA2. Similarly, winding portions 154B1 and 154B2 form winding 154B, winding portions 154BB1 and 154BB2 form winding 154BB, winding portions 156C1 and 156C2 form winding 156C, and winding portions 156CC1 and 156CC2 form winding 156CC.

The principal secondary windings 152, 154 and 156 are electrically connected in a wye configuration with the common connection 158 being electrically connected to ground 101. Electrically attached to each principal secondary winding are two auxiliary secondary windings with each electrically connected combination of principal secondary and two auxiliary secondary windings having like or matching polarities as indicated by the polarity markings shown in FIG. 3. The two attached auxiliary secondary windings are chosen such that in each of the combinations of windings all three electrical phases are present. In FIG. 3, principal secondary windings 152, 154 and 156 are associated with phases a, b and c, respectively. Accordingly, an auxiliary secondary winding associated with phase b—154BB—and one associated with phase c—156C—would be electrically attached to principal secondary winding 152; similarly for principal secondary windings 154 and 156. Each auxiliary secondary winding is in turn electrically connected to an individual phase of one of the two dynamic stabilizers. The connection arrangement of the secondary windings, principal and auxiliary, and the stabilizers is such that corresponding phases of each stabilizer and principal secondary winding are the same. For stabilizer 110 the three phases are labelled a', b' and c'; those for stabilizer 120 are a", b" and c". Thus, principal secondary winding 152 which is of phase a is electrically connected to the phases a' and a" of stabilizers 110 and 120, respectively, via auxiliary windings 154BB and 156C, respectively, and conductors 160 and 162, respectively.

For principal secondary winding 154 and phases b' and b" of stabilizers 110 and 120, respectively, the connections are made via auxiliary secondary windings 156CC and 152A, respectively, and conductors 166 and 164, respectively. Similarly, for principal secondary winding 156 and phases c' and c" of the stabilizers 110 and 120, respectively, the connections are made via auxiliary secondary windings 152AA and 154B, respectively, and conductors 168 and 170, respectively.

The voltage and currents for stabilizer 110 are $v_a'$, $v_b'$ and $v_c'$ and $i_a'$, $i_b'$ and $i_c'$ and those for stabilizer 120 are $v_a''$, $v_b''$, and $v_c''$ and $i_a''$, $i_b''$, $i_c''$. These are also referred to as single prime or double prime voltages and currents. These voltages measured are with respect to ground 101 and the current flow is as shown by the arrows. The stabilizers 110 and 120 are substantially identical. Each comprises a plurality of varible reactances electrically connected in delta. For stabilizer 110, there are variable reactances 111, 113 and 115, while for stabilizer 120 these are 121, 123 and 125. The thyristor pairs, 111A and B, 113A and B, 115A and B, 121A and B, 123A and B, and 125A and B, which are connected in series with their respective reactances, are used to control the reactive currents thus creating a variable reactance. The thyristor pairs are connected in a reverse parallel manner. This allows current control during both the negative and positive portions of the system voltages.

During operation, a tachometer is used to sense the mechanical resonant oscillating speed of the rotor of the generator which is superimposed upon the normal operating speed of the rotor. Typically, the normal operating speed of the rotor is 3600 rpm whereas the oscillating frequency may be about 25 Hz. The signal representing the speed of 3600 rpm is filtered out by conventional signal conditioning means leaving a signal having the mechanical frequency of the subsynchronous resonance at the rotor. This conditioned rotor speed signal controls the conduction angle of the thyristor pairs of the stabilizers acting to increase or decrease the value of the reactances. As rotor speed decreases, the conduction angle increases, increasing the reactive power to the stabilizer and making the stabilizers appear to have decreased in reactance. As rotor speed increases, the conduction angle of the thyristor pairs decreases, decreasing the reactive power to the stabilizer and making the stabilizers appear to have increased in reactance.

The mechanical subsynchronous frequency is related to the frequency of the subresonant currents in the electrical portion of the system in that it is essentially the difference between the normal operating frequency of the system and the frequency of the subsynchronous resonant currents found therein. For example, where a typical system frequency is 60 Hz and a typical value for the frequency of subsynchronous resonant currents circulating in the system is 40 Hz, the expected mechanical frequency of oscillation would be 60 Hz − 40 Hz or 20 Hz.

Figure 4:
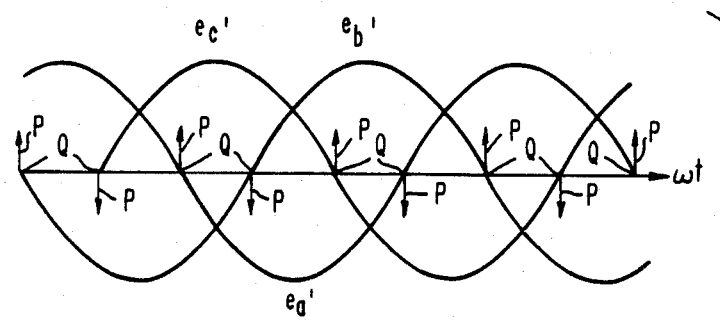
FIG. 4 is an illustration of the voltage wave forms across the thyristor-controlled reactors illustrated in FIG. 3 for a transformer with no leakage reactance.
Figure 4:
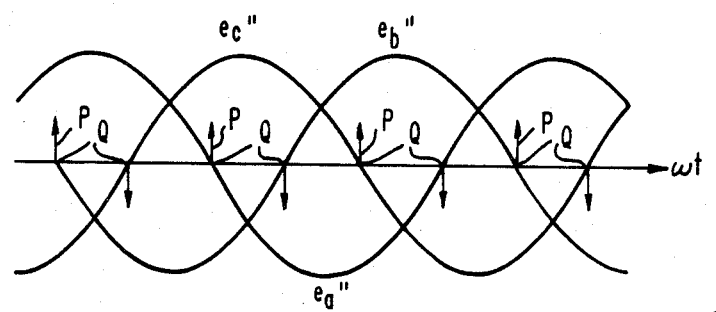

FIG. 4 illustrates the relationship of the current and voltages of the variable reactors in each of the stabilizers 110 and 120. The sinusoidal waves $e_a'$, $e_b'$, $e_c'$, $e_a''$, $e_b''$ and $e_c''$ are the voltages across their respective reactances. For stabilizer 110

$$e_a' = v_b' - v_c' \quad (1)$$

$$e_b' = v_c' - v_a' \quad (2)$$

$$e_c' = v_a' - v_b' \quad (3)$$

The double prime voltages are found in a similar fashion. The arrows represent current pulses P. For each complete cycle, 6 current pulses are produced in each stabilizer or a total of 12 current pulses for both. As a result, this stabilizer arrangement is also referred to as a 12 pulse system. If the thyristors in each stabilizer are fired in the conventional manner so that all reactors have the same conduction or phase angle, then a current pulse P will occur which corresponds to each voltage zero crossing, point Q, with the current pulse P being exactly symmetrical with the zero crossing point Q.

The current pulses P produce harmonic currents. Because of the symmetry of the current pulses, P, they contain no even harmonics and the odd harmonics which are multiples of 3 will circulate within the delta connected reactances of each stabilizer. The odd harmonic currents produced are described by the series 1, 5, 7, 11, 13, 17, 19...n where n is an odd integer not divisible by 3. The harmonic frequencies corresponding to n=1, 7, 13, 19...(add 6 each time) produce balanced polyphase currents having the phase rotation a, b, c while those frequencies corresponding to n=5, 11, 17...(add 6 each time) produce balanced polyphase currents having the phase rotation a, c, b. Under the principles of symmetrical electrical components, these two sets of currents are termed positive sequence currents and negative sequence currents respectively. Also, as can be appreciated by those knowledgeable in this area, no zero sequence harmonic currents are supplied to the generator due to the thyristor control.

In determining the effectiveness of the transformer 130 in cancelling unwanted harmonic currents produced in the stabilizer, the situation is first analyzed from the viewpoint of an ideal transformer. In stabilizer 110 the voltages and currents for the three phases a', b' and c' are displaced 120 degrees; similarly, for the voltages and currents of phases a'', b'' and c'' of stabilizer 120. The geometry of the waveform suggests that cancellation of selected harmonic currents will occur if there is a phase shift of 30 degrees between the voltage of phases a', b' and c' of stabilizer 110 and phases a'', b'' and c'' of stabilizer 120. This phase shift is controlled by the turns ratios between the auxiliary secondary windings and the principal secondary windings and by the polarities of the transformer windings.

The primary delta connected windings have a number of turns equal to q times those of the principal secondary windings. For equal primary winding input voltages and secondary winding output voltages, the theoretical value for q is $3/\sqrt{2}$. The number of turns on the auxiliary secondary windings should be k times the number of turns on the principal secondary windings. For k the theoretical value is $(\sqrt{3}-1)/2$. In practice the actual values for q and k can be within ±0.1% of their theoretical values. For the polarities of the transformer windings as indicated in FIG. 3, the single prime voltages lead the double prime voltages by 30 degrees. With respect to the voltages of the principal secondary windings, the single prime voltages lag them by about 15 degrees while the double prime voltages lead them by about the same amount. The reverse can also be applied provided that the control signals to the thyristors are also appropriately changed.

With the values given for q and k, the amplitude of the sinusoidal voltages $v_a$ $v_b$ and $v_c$ of the primary windings 142, 144 and 146, respectively, and the single and double prime voltages are assumed to be equal, i.e., a one-to-one overall voltage transformation. If this is not the case, a scaling factor is included in the value given for q to account for the amplitude differences between the primary voltage and secondary voltage. For example, if $q = n(3/\sqrt{2})$, the primary voltages would be n times the secondary output voltages. Further, these values of q and k are also valid for a transformer having leakage reactance.

Figure 1:
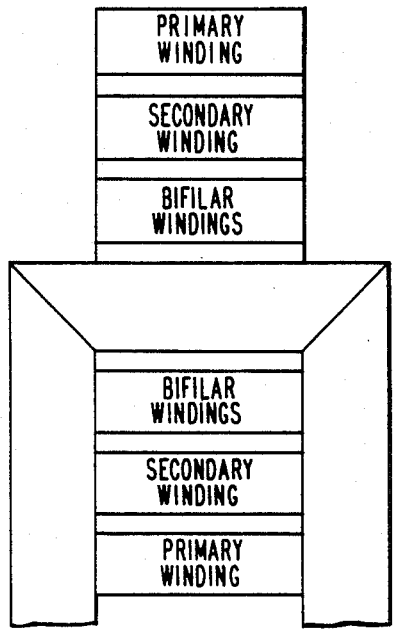
FIG. 1 is a simplified representation of the winding arrangement utilized in the prior art with the windings shown in section.
Figure 5:
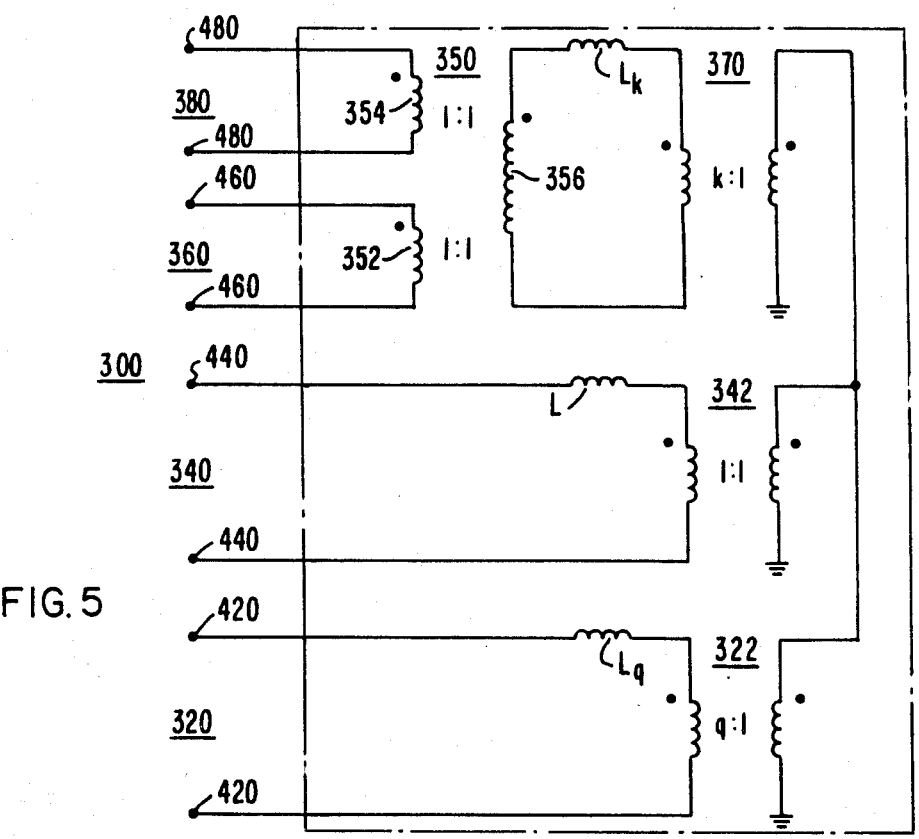
FIG. 5 is a schematic circuit of one phase of the three phase transformer of FIG. 3.

The coupling transformer of the present invention, although it would generally be realized as a three phase transformer, can be considered as three single phase transformers for analytical purposes. Referring now to FIG. 5, an equivalent circuit for the phase a transformer is shown. Similar circuits would apply to the transformers for phases b nd c. The single phase transformer 390 has four windings that include the primary winding 320, the principal secondary winding 340, and two auxiliary secondary windings 360 and 380. In practice the two auxiliary secondary windings 360 and 380 are wound bifilar and for this reason are considered to be 100% coupled. Per phase there are four windings which in general lead to quite complex equivalent circuits. Here as the two auxiliary secondary windings are close coupled, the simpler equivalent circuit of FIG. 5 may be used. This is a special adaptation of a three winding equivalent circuit.

The transformer 300 has four pairs of terminals. Terminal pair 420 corresponds to primary winding 320; terminal pair 440 for principal secondary winding 340; terminal pairs 460 and 480 for the auxiliary secondary windings 360 and 380, respectively. The circuit elements within the dotted lines of FIG. 5 constitute the equivalent circuit for the phase a transformer. The equivalent circuit comprises four ideal transformers:

transformer 322 associated with primary winding 320 and having a turns ratio of q:1;

transformer 342 associated with principal secondary winding 340 and having a turns ratio of 1:1;

transformers 350 and 370 associated with the auxiliary secondary windings 360 and 380. For the ideal transformers 350 and 370, transformer 350 has three windings 352, 354 and 356, each having a 1:1 turns ratio between any pair of the three windings 352, 354 and 356. Transformer 370 has a turns ratio of k:1.

Inspection of the equivalent circuit shows that cancellation of ampere turns must hold between the four windings 320, 340, 360 and 380 of the transformer 300 as well as the required no load voltage ratios. The influence of the leakage reactance of the transformer 300 is represented by the inductances $L_q$, L and $L_k$ where $L_q$ = leakage reactance of the primary winding 320;
L = leakage reactance of the principal secondary winding 340; and
$L_k$ = common leakage reactance of the auxiliary secondary windings 360 and 380.

$L_k$ can also be considered as the leakage reactance of either of the bifilar wound auxiliary secondary windings. Because of the 100% coupling for bifilar windings, these descriptions of $L_k$ are interchangeable. If $L = 2L_k$ or if there is no leakage reactance, then what occurs is the perfect cancellation of the harmonic currents of the series 5, 7, 17, 19, 29, 31...n, p where:

$n = 5 + z;$
$p = 7 + z;$ and
$z =$ multiples of 12.

Because it is not possible to build a transformer having no leakage reactance, the transformer of the present invention should be constructed such that the leakage reactance $L = 2L_k$ with a variation of about 10% high or low.

Figure 6:
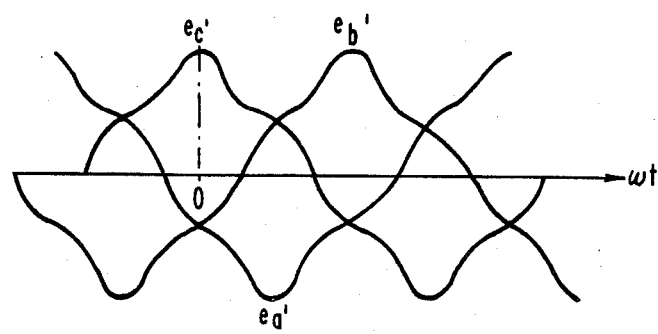
FIG. 6 is an illustration of the voltage wave forms of FIG. 4 including the influence of transformer leakage reactance.

For this case, FIG. 6 illustrates the effect of these leakage reactances upon the voltages in the stabilizer. This figure shows the voltage waveforms $e_a'$, $e_b'$ and $e_c'$ for the reactances 111, 113 and 115, respectively, of stabilizer 110; similar waveforms are produced for stabilizer 120. In FIG. 6 the fifth harmonic is shown added to the voltage waveforms for $e_a'$, $e_b'$ and $e_c'$. Inspection of these waveforms shows the half wave symmetry, i.e., $e_a'wt) = e_a'(-wt)$, which is present in the waveforms of FIG. 4. This assures that the current pulses produced in the stabilizers will be symmetrical and properly phased to yield currents into the coupling transformer which will be selectively cancelled. Addition of the remaining odd harmonics will result in a substantially more distorted voltage waveform but one which still exhibits half-wave symmetry. Thus, sine wave voltages are not required to obtain the desired harmonic cancellation.

Figure 7:
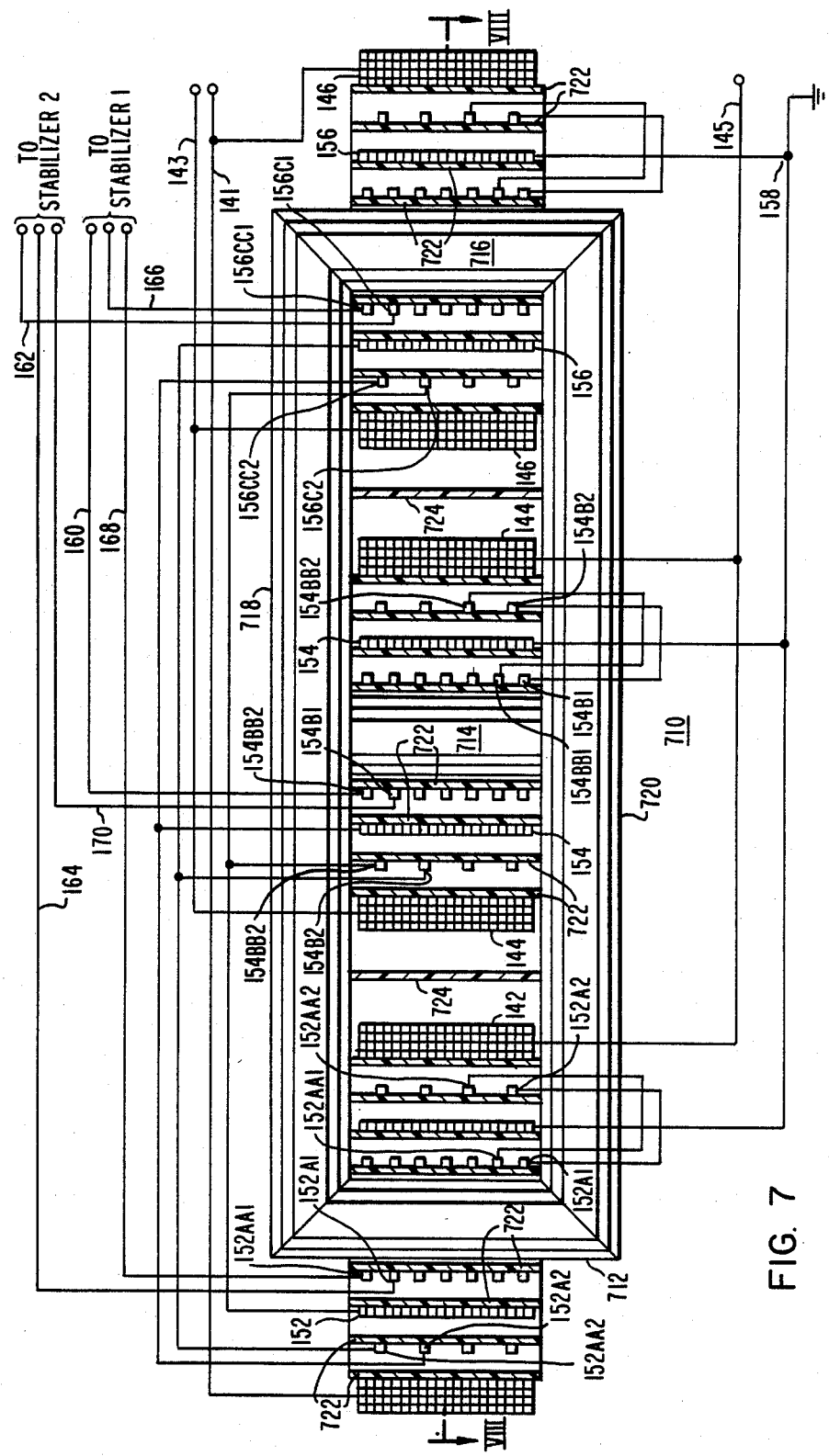
FIG. 7 is an elevational view of the present invention showing the windings in section about the legs of the core.
Figure 8:
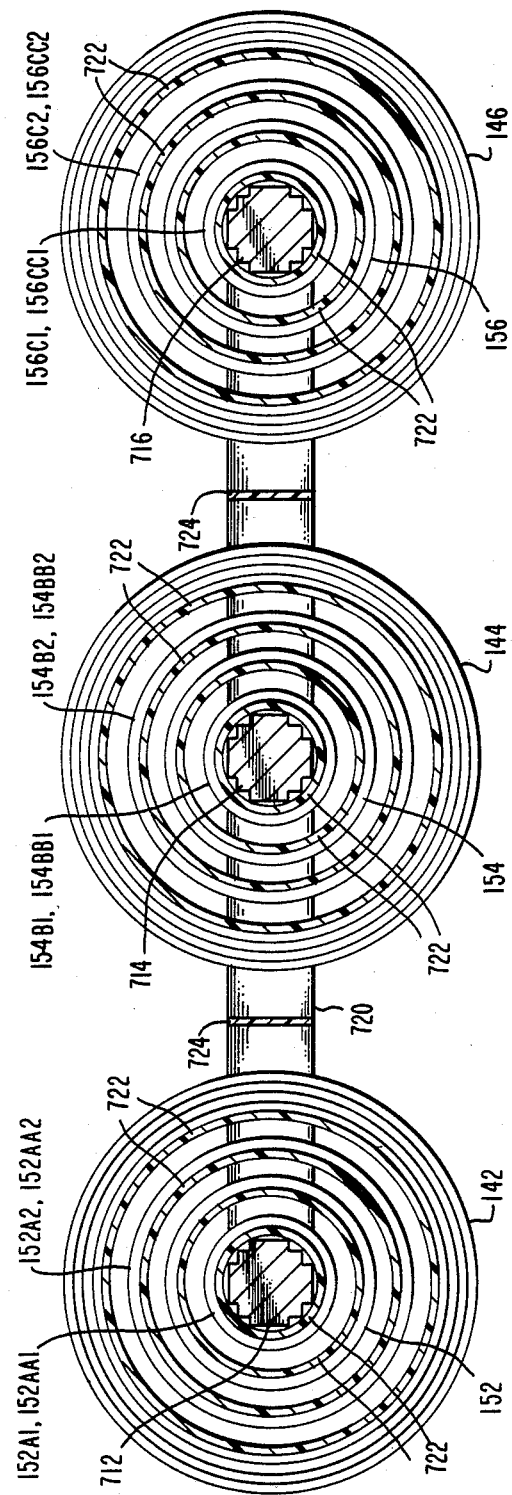
FIG. 8 is a sectional plan view of the invention taken along line VII—VII of FIG. 7.

In FIGS. 7 and 8 a winding arrangement is shown for the coupling transformer 130 that realizes the positive values for both L and $L_k$ required for harmonic cancellation. The transformer 130 has a three legged magnetic core 710. The core 710 is laminated and consists of three spaced-apart legs 712, 714 and 716 that are connected at their opposite ends to a top yoke 718 and a bottom yoke 720. For convenience only, legs 712, 714 and 716 are associated with phases a, b and c, respectively.

In general, the windings associated with each phase are wound on insulating tubes 722 and are then positioned about each leg prior to attaching the top yoke. An insulating board 724 is inserted between adjacent windings of the different phases. Because the arrangement of the windings about each leg of the core for each phase are substantially the same, only the arrangement for phase a will be described. The two auxiliary secondary windings per phase are wound to provide first and second common bifilar portions. For phase a these first and second common bifilar portions are represented by winding portions 152A1 and 152AA1 and winding portions 152A2 and 152AA2, respectively. A similar correspondence exists with phases b and c.

The first common bifilar portion, winding portions 152A1 and 152AA1, the principal secondary winding 152, the second common bifilar portion, winding portions 152A2 and 152AA2, and the primary winding 142 are positioned coaxially and radially adjacent, in the recited order, starting from leg 712 of the magnetic core 710. The windings for the other two phases are similarly arranged. The primary windings 142, 144 and 146 are connected in delta. The principal secondary windings 152, 154 and 156 and auxiliary secondary windings 152A, 152AA, 154B, 154BB, 156C and 156CC are connected in a forked wye wherein one auxiliary secondary winding of each of the other two phases is electrically connected to a free end of each of the wye connected principal secondary windings resulting in all three phases being present in each combination of principal secondary windings and auxiliary second windings. By splitting the two auxiliary secondary windings into the first and second common bifilar portions and inserting the latter between the principal secondary winding and the primary winding for each phase, the leakage reactances of the principal secondary winding and the common leakage reactance of the auxiliary secondary windings attached thereto for each phase are made positive in value. With this arrangement producing the positive values for the reactances L and $L_k$, the secondary windings can be constructed so that the leakage reactance of the principal secondary winding is made to be about twice that of the common leakage reactance of the auxiliary secondary windings. This arrangement of windings also permits existing fabrication equipment to be used for the construction of the transformer. The secondary windings are also wound to meet the turns ratio of $(\sqrt{3} - 1)/2$. With these two conditions met, the transformer when interconnected as previously described will produce the desired cancellation of selected harmonic frequencies.

Preferably, the primary windings are continuous wound windings and the principal secondary windings and the auxiliary secondary windings are helitran wound windings.

We claim:

1. A three phase core form transformer, comprising:
   a three legged magnetic core;
   a plurality of primary windings corresponding to the phases;
   two auxiliary secondary windings per phase, wound to provide first and second common bifilar portions;
   a plurality of principal secondary windings corresponding to the number of primary windings;
   the first common bifilar portion, the principal secondary winding, the second common bifilar portion, and the primary winding being coaxial and radially adjacent, in the recited order, starting from each leg of the magnetic core, the primary windings being connected in delta, the principal secondary windings and auxiliary secondary windings being connected in a forked wye wherein one auxiliary secondary winding of each of the other two phases is electrically connected to a free end of each of the wye connected principal secondary windings resulting in all three phases being present in each combination of principal secondary windings and auxiliary secondary windings, wherein the leakage reactance of the principal secondary winding and the common leakage reactance of the auxiliary secondary windings attached thereto for each phase are positive in value with the leakage reactance of the principal secondary winding being about twice that of the common leakage reactance of the auxiliary windings.

2. The transformer of claim 1 wherein the primary windings are continuous wound windings.

3. The transformer of claim 1 wherein the principal secondary windings are helitran wound windings.

4. The transformer of claim 1 wherein the auxiliary secondary windings are helitran wound windings.

5. The transformer of claim 1 wherein the primary windings are continuous wound windings and the principal secondary windings and the auxiliary secondary windings are helitran wound windings.

* * * * *